April 3, 1951  A. S. BISHOP  2,547,363
ELECTRICAL MARKING AND SCANNING CONTROL CIRCUIT
Filed June 7, 1945  2 Sheets-Sheet 1
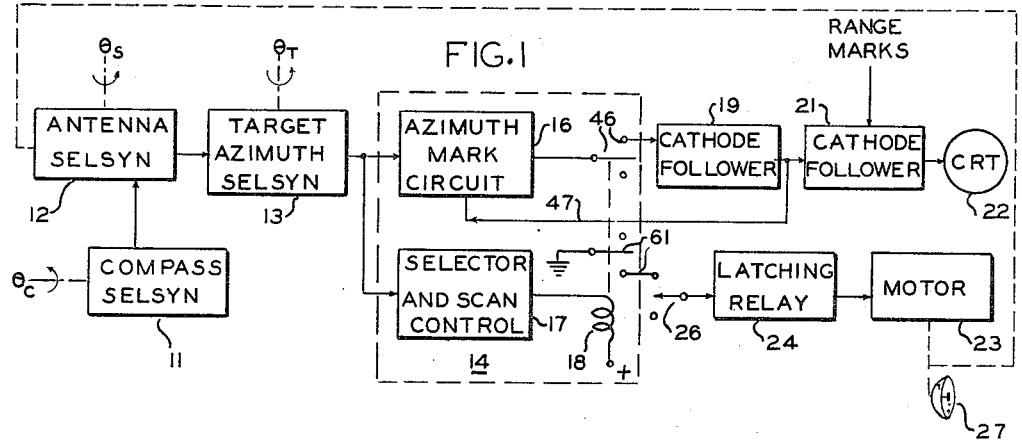
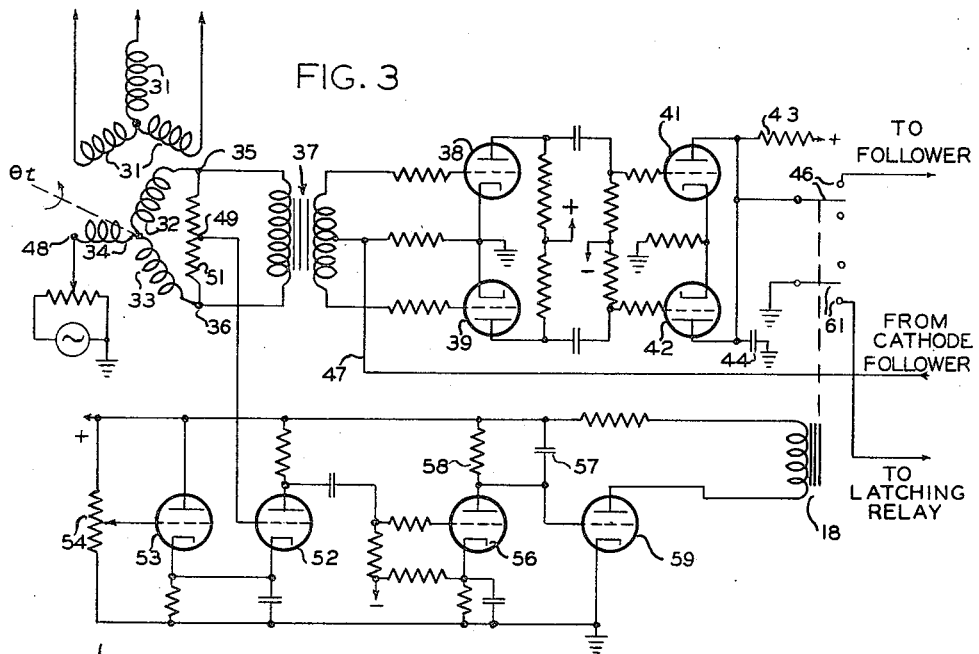
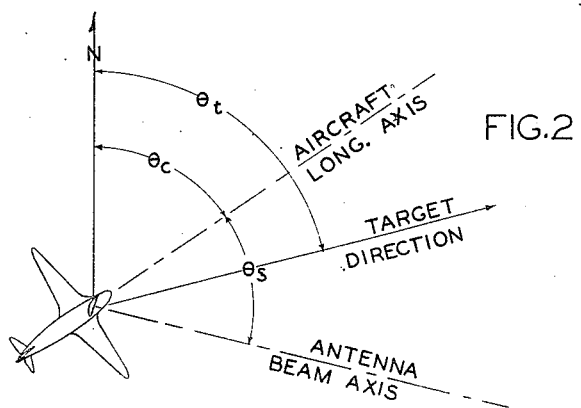
INVENTOR
AMASA S. BISHOP
BY
William D. Hall
ATTORNEY Patented Apr. 3, 1951

2,547,363

UNITED STATES PATENT OFFICE 2,547,363

ELECTRICAL MARKING AND SCANNING CONTROL CIRCUIT

Amasa S. Bishop, Cambridge, Mass., assignor, by mesne assignments, to the United States of America as represented by the Secretary of War Application June 7, 1945, Serial No. 598,157

6 Claims. (Cl. 343—117)

This invention relates generally to electrical circuits, and more particularly to an azimuth mark and sector scan control circuit for a radio object detection apparatus.

In certain airborne radio object detection equipments, an auxiliary apparatus, for example that disclosed in the application by John W. Gray and Ivan A. Greenwood, Jr., Serial No. 598,161, entitled "Electrical Apparatus," filed June 7, 1945, is used to give a continuous indication of the location of the aircraft with respect to an arbitrarily-selected origin of ground coordinates. One method of presenting this indication is to show on a cathode ray tube indicator a set of electronically produced indices or cross-hairs which intersect upon the trace representing an object on the ground. Of these cross-hairs, one is a bright trace passing through the trace of the ground object, and a point on the screen representing the location of the aircraft; this trace is called the azimuth mark. The other cross-hair is a circular trace, passing through the trace of the ground object, and having as its center the point representing the location of the aircraft; this trace is called the range mark. It is an object of this invention to provide an apparatus for producing the azimuth mark.

In the type of airborne installation described above, it is frequently desirable to cause the antenna of the radio object detection apparatus to oscillate through a restricted horizontal angle while aimed generally in the direction of some point of particular interest such as a target to be bombed. This mode of operation is termed sector scanning. The cathode ray tube indicator thus presents only a limited sector of the total ground area within the range of the apparatus, as contrasted with the more usual case in which the antenna rotates continuously through 360° and the indicator shows all of the ground area within range. It is a further object of this invention to provide means for causing the antenna to scan a sector of the total horizontal angle.

Other objects, features, and advantages of this invention will suggest themselves to those skilled in the art and will become apparent from the following description of the invention taken in connection with the accompanying drawing in which:

Fig. 1 is a block diagram showing the relationship of this invention to other components with which it may be used;

Fig. 2 is a diagram showing the geometry involved in the explanation of this invention;

Fig. 3 is a schematic wiring diagram of this invention; and

Figure 4:
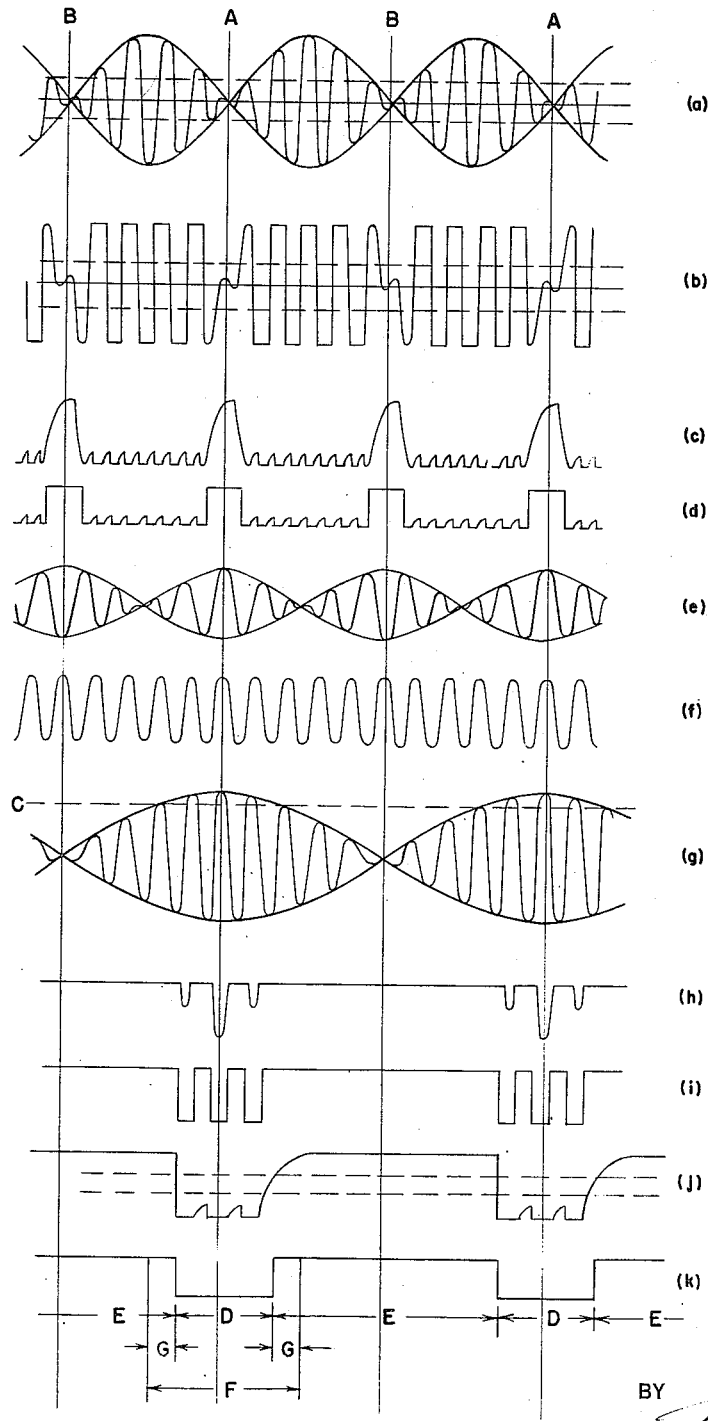
Fig. 4 is a group of voltage wave forms used in explaining the operation of this invention.

Referring now more particularly to Figs. 1 and 2, the shaft of compass "Selsyn" 11 is driven by a compass of any type having sufficient torque so that the angular displacement of the rotor of "Selsyn" 11 is equal to the angle of the aircraft headed from true north, $\theta_c$ in Fig. 2. Antenna "Selsyn" 12 is of the differential type, which is well known in the art, and is driven by the antenna so that its rotor angular displacement is equal to the angle between the antenna beam axis and the aircraft longitudinal axis, $\theta_s$ in Fig. 2. Target azimuth "Selsyn" 13 is driven by a computer, not shown, so that its rotor angular displacement is equal to the target azimuth $\theta_t$ of Fig. 2. The rotor of "Selsyn" 11, a single winding, is energized from a source of alternating voltage, not shown, and the stator terminals are connected to the stator terminals of "Selsyn" 12. The rotor terminals of "Selsyn" 12 are connected to the stator terminals of "Selsyn" 13, and the rotor windings of "Selsyn" 13 supply the electrical input to azimuth mark circuit 16 and selector and scan control circuit 17.

Target azimuth "Selsyn" 13 is also of the differential type, having a rotor with three windings distributed at 120° intervals in space phase, and may be connected in either the Y or the delta pattern, although the Y connection is shown here. The connections between "Selsyns" 11, 12, and 13 are so made that the amplitude of the voltage output between two of the rotor terminals of "Selsyn" 13 varies as the sine of the angular difference between the target azimuth and the sum of antenna angle and compass heading. Expressed analytically, $E_{max} = K \sin(\theta_c + \theta_s - \theta_t)$ where $E_{max}$ is the amplitude of the output voltage, and K is a proportionality factor.

Circuit 14 has two channels, namely azimuth-mark circuit 16 and selector and scan control circuit 17, each of which is driven by an output voltage from "Selsyn" 13 as mentioned above. Azimuth mark circuit 16 produces voltage pulses, in a manner to be described, at the proper time for azimuth marks. These pulses are fed, when relay 18 is not energized, to cascaded cathode followers 19 and 21, mixed in cathode follower 21 with voltage pulses for producing a range mark, from other equipment not shown, and finally applied to the intensity grid of cathode ray tube 22, which is the indicator of the radio object detection apparatus.

Selector and scan control channel 17 operates in a manner to be described, to energize periodically relay 18 which eliminates an undesired azimuth mark if 360° scan is used, and, if sector scan is being used causes reversal of the antenna driving motor 23 by momentarily completing a ground circuit to latching relay 24. Latching relay 24 may be of the type which has two de-energized positions, and changes from one position to the other whenever one terminal is grounded. Alternatively relay 24 may be of the rotary stepping type which moves one step each time the operating coil is energized, and having the contacts on adjacent steps arranged to drive motor 23 in opposite directions. Both types of relay are well known in the art. Switch 26 disconnects the grounding contact of relay 18, to permit the uninterrupted rotation of antenna 27 for 360° scan.

Referring now more particularly to Figs. 3 and 4 for a detailed description of the operation of this invention, stator windings 31—31—31 of "Selsyn" 13 produce an alternating magnetic flux whose direction is dictated by the sum of the compass heading and the antenna angle, $\theta_c + \theta_s$. "Selsyn" 13 is so adjusted that when the computed target azimuth $\theta_t$ is equal to the sum $\theta_c + \theta_s$, the sum of the voltages induced in rotor windings 32 and 33 is zero, and no voltage appears between terminals 35 and 36. This is the condition indicated at the times A—A in Fig. 4. Attention is invited to the fact that for simplicity in drawing Fig. 4, the excitation frequency of "Selsyns" 11, 12, and 13 is shown as only ten times the antenna rotational frequency. Actually there may be several thousand cycles of exciting voltage per antenna revolution, so that the wave forms are somewhat better than those shown in Fig. 4.

If the antenna be allowed to rotate with constant angular speed, the wave form of voltage between terminals 35 and 36 is approximately that shown in Fig. 4a. The voltage from terminals 35 and 36 is fed, through transformer 37, to an overdriven push-pull amplifier comprising tubes 38 and 39, and thence to a full-wave plate detector circuit comprising tubes 41 and 42. It will be obvious to those skilled in the art that the wave form of voltage at the grid of tube 41 is approximately as represented in Fig. 4b, and that the wave form at the grid of tube 42 is similar but inverted.

Since tubes 41 and 42 are supplied with plate voltage through common load-resistor 43, and due to the presence of condenser 44, the wave form of voltage at the plates of tubes 41 and 42 is as shown in Fig. 4c, if feedback channel 47 is disconnected. This voltage is fed through contacts 46 of relay 18 and applied to cathode follower 19 of Fig. 1. When feedback channel 47 from the output of cathode follower 19 to the center-tap of transformer 37 is connected, the entire circuit comprising tubes 38, 39, 41, and 42 operates as a multivibrator which is triggered by each of the large pulses of Fig. 4c. It relaxes to its untriggered state after a time determined primarily by the time constants in the plate circuits of said tubes, so that the output voltage wave form at the plates of tubes 41 and 42 is as shown in Fig. 4d. The large positive pulses of this wave form are used to intensify the electron-beam of cathode ray tube 22 to produce the desired azimuth mark. These pulses, however, would also produce an azimuth mark when the antenna is looking directly away from the target. Alternate pulses in this voltage wave form must therefore be removed.

Rotor winding 34 of "Selsyn" 13 has a voltage induced in it which has a maximum amplitude at the time that the voltage between terminals 35 and 36 is zero, as illustrated in Fig. 4e. An alternating voltage whose amplitude is equal to the maximum amplitude of the voltage in winding 34, as shown in Fig. 4f, is added at terminal 48, so that the voltage with respect to ground at center tap 49 of resistor 51 is substantially as shown in Fig. 4g.

The voltage at center tap 49 is fed to the grid of tube 52, the bias of which is controlled by the conduction of tube 53 as adjusted by potentiometer 54. The cut-off potential of tube 52 is adjusted to approximately the level of the dashed line C in Fig. 4g, so that the wave form at the plate of tube 52 is that shown in Fig. 4h. Tube 56 further amplifies and clips this wave, to give at its plate the wave form shown in Fig. 4i, if condenser 57 were absent. It will be obvious to those skilled in the art that with condenser 57 present and with resistor 58 sufficiently large, the wave form at the plate of tube 56 is approximately that of Fig. 4j. Tube 59 therefore operates in a manner similar to that of a switch, having a plate-current wave form as shown in Fig. 4k, so that relay 18 is energized in the intervals E—E and deenergized in the intervening intervals D—D. Accordingly, the azimuth mark pulses produced at the times B—B in Fig. 4 are eliminated by opening of contacts 46 of Fig. 1, so that the ambiguous azimuth mark pointing away from the target is not produced.

If it be now assumed that switch 26 of Fig. 1 is closed, it will be obvious to those skilled in the art that the momentary grounding, through relay contacts 61, of latching relays 24, will cause reversal of driving motor 23, and the antenna 27 will oscillate through an angle approximately as represented by the interval F in Fig. 4k, to produce the desired sector scan. The magnitude of the overshoot G—G at either end of the sector is determined largely by the torque-to-inertia ratio of the mechanical system comprising antenna 27 and driving motor 23. The width of the central portion D of the sector scanned is controlled by adjustment of potentiometer 54 of Fig. 3.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In a radio echo transmitting and receiving system including rotating antenna means and cathode ray tube indicator means, a first means for producing a first sinusoidal voltage proportional in amplitude to the sine of any given angle; a second means for transforming said first sinusoidal voltage into a first alternating voltage wave the peak-to-peak amplitude of which has nulls coincident in time with the values of zero and 180° of said angle; a third means for producing a first series of voltage pulses coincident in time with the nulls of said first alternating voltage wave; a fourth means for applying said voltage pulses to an electron beam intensity-controlling electrode of said cathode ray tube indicator means; a fifth means coupled to said means, for producing a second alternating voltage wave the maximum amplitudes of which coincide in time with the value of zero of said angle; a sixth means coupled to said fifth means, for producing a second series of voltage pulses coincident in time with the maxima in amplitude of said second alternating voltage wave; a seventh means adapted to be operated by said sixth means and coupled to said sixth and fourth means, for causing each pulse of said second series of voltage pulses to render said fourth means operative for the duration of each of said pulses, whereby only those pulses of said first series of voltage pulses that coincide with zero value of said angle will be applied to said cathode ray tube indicator means.

2. In a radio echo transmitting and receiving system including rotating antenna means and indicator means, means coupled to said antenna means, for producing a marking pulse when said antenna means points directly toward or directly away from a target; means coupled to said last named means, for applying said marking pulse to said indicator means; means for producing a voltage pulse only at a time when said antenna means points directly at said target; means coupled to said last named means, for varying the width of said voltage pulse; means coupled to and operated by said voltage pulse, for reversing the direction of rotation of said antenna means; and means coupled to said means for applying said marking pulse to said indicator means and also operated by said voltage pulse, for eliminating the marking pulse when said antenna means points directly away from said target.

3. Apparatus as set forth in claim 1, and also including an eighth means coupled to said rotating antenna means and adapted to be operated by said sixth means, for reversing the direction of rotation of said antenna means; and ninth means coupled to said eighth and sixth means, for selectively interconnecting said two last named means and thereby causing said antenna means to repeatedly scan an angular sector.

4. Apparatus as set forth in claim 3, and also including tenth means coupled to said sixth means, for varying the pulse width of the pulses comprising said second series of voltage pulses, whereby the angular sector scanned by said antenna means is also caused to be varied.

5. In radio echo transmitting and receiving apparatus including rotating antenna means and cathode ray tube indicator means, a circuit for producing an azimuth target marker upon said cathode ray tube indicator means and for causing said antenna means to scan a desired sector, said circuit comprising first voltage wave producing means, coupled to said antenna means, for producing first alternating voltage waves of a given frequency and the peak-to-peak amplitude of which has nulls whenever said antenna means is pointing directly toward or directly away from said target; first pulse forming means coupled to said first voltage wave producing means, for producing a pulse for every null occurring in said first voltage waves; coupling means connected between said first pulse producing means and said cathode ray tube indicator means, for coupling said pulses to said indicator means and thus causing said indicator means to depict an azimuth marker whenever said antenna means points directly toward or directly away from said targets second voltage wave producing means, coupled to said first wave producing means, for producing second alternating voltage waves of a frequency half that of said first voltage waves and with maximum peak-to-peak amplitudes coinciding with the pointing of said antenna means directly toward said target and therefore also coinciding with every second null of said first voltage wave; second pulse forming means coupled to said second wave producing means, for producing a pulse for every maximum peak-to-peak amplitude in said second voltage waves; first switch means coupled to said second pulse forming means and to said coupling means, and adapted to be operated by said second pulse forming means, whereby said coupling means is only connected to said first pulse forming means for the width of the output pulse derived from said second pulse forming means, so that only the pulse derived from said first pulse forming means when said antenna means is pointing directly toward said target is coupled to said cathode ray tube indicator means; reversing means coupled to said rotating antenna means and adapted to be operated by voltage pulses derived from said second pulse forming means, for reversing the direction of rotation of said antenna means; and second switch means connected between said reversing means and said second pulse forming means, for selectively interconnecting said two last named means and thereby causing said rotating antenna means to repeatedly scan an angular sector.

6. A circuit as set forth in claim 5, and also including variable means coupled to said second pulse forming means, for varying the pulse width of the pulses produced by said second pulse forming means and thereby causing the angular sector scanned by said antenna means to be varied.

AMASA S. BISHOP.

REFERENCES CITED

The following references are of record in the file of this patent:

UNITED STATES PATENTS

| Number | Name | Date |
|---|---|---|
| 1,814,842 | Murphy | July 14, 1931 |
| 1,991,443 | Becker | Feb. 19, 1935 |
| 2,308,936 | Schuchardt et al. | Jan. 19, 1943 |